Patented Sept. 18, 1945

2,385,037

UNITED STATES PATENT OFFICE 2,385,037

PROCESS FOR THE PRODUCTION OF
DERIVATIVES OF NITROETHYLENE

Arthur Ernest Wilder Smith, Norton-on-Tees,
England, assignor to Imperial Chemical Industries Limited, a corporation of Great Britain No Drawing. Application July 19, 1943, Serial No.
495,360. In Great Britain April 20, 1942

2 Claims. (Cl. 260—644)

This invention relates to the production of polymerised nitroethylene.

We have now found that polymerised nitroethylene is formed by reacting 1:2-dinitroethane with a carbonate, bicarbonate, or hydroxide of an alkali metal, alkaline earth metal or ammonia in the presence of an aqueous medium.

The reaction may be carried out at normal temperature, but higher or lower temperatures may be used.

It is desirable to add the 1:2-dinitroethane to the aqueous medium containing the carbonate, bicarbonate or hydroxide, and to add it in small amounts at first in order to give the reaction time to start, otherwise solid polymerised nitroethylene is liable to form a coating on the dinitroethane and inhibit further reaction. The commencement of the reaction may be promoted by adding a small amount of a nitrite. The dinitroethane may be added in the form of a fine powder or in liquid form, since it melts at about 38°-40° C., and can be supercooled as low as 20° C. However, both these methods are liable to give a product which contains unreacted dinitroethane, and it is therefore preferred to add it in the form of a solution in a suitable organic solvent, e. g., dioxan, acetone or an ester of a lower fatty acid. Whichever method is employed, vigorous stirring is very desirable to promote complete reaction.

*Example 1*

5 grams 1:2-dinitroethane were dissolved with warming in 10 ccs. dioxan and added slowly with vigorous stirring to a suspension of 10 grams precipitated chalk in 150 ccs. water. The commencement of the reaction was indicated by the intensely lachrymatory effect of monomeric nitroethylene. After the addition of all the dinitroethane solution, the mixture was stirred until no smell of monomeric nitroethylene was detectable. The excess chalk was then dissolved by adding nitric acid slowly until in excess. The substance sold under the registered trade-mark "Calsolene" was added as an anti-frothing agent during the neutralisation. The precipitate of polymerised nitroethylene was filtered, washed well with water, then with methanol, and dried.

*Example 2*

180 grams of 1:2-dinitroethane were dissolved in 1900 ccs. of cold methanol and to this solution, while stirring, were added 30–40 ccs. of a solution of ammonium bicarbonate containing 120 grams of ammonium bicarbonate in 1900 ccs. of water. When the reaction had started, the remainder of the ammonium bicarbonate solution was added within 1–2 minutes, and the mixture stirred for 20 minutes. The precipitated polymerised nitroethylene was then removed by filtration and the layer of polymer on the filter covered with an aqueous hydrochloric acid solution containing 30% by volume of concentrated hydrochloric acid, and allowed to stand for 12 hours. The hydrochloric acid solution was then removed by suction, and the polymer stirred with 4 lts. of water for approximately 20 hours. This water washing was repeated three times, and then the polymer was washed once with 1.5 lts. of methanol in the same way. After filtration the polymer was dried in a stream of cold air for three days and then over phosphorus pentoxide.

I claim:

1. A process for the preparation of polymerised nitroethylene which comprises reacting 1:2-dinitroethane in the presence of an aqueous medium with a substance selected from the group: alkali metal carbonate, alkali metal bicarbonate, alkali metal hydroxide, alkaline earth metal carbonate, alkaline earth metal bicarbonate, alkaline earth metal hydroxide, ammonium carbonate, ammonium bicarbonate, ammonium hydroxide.

2. A process for the preparation of polymerised nitroethylene which comprises reacting a solution of 1:2-dinitroethane in an organic solvent, with an aqueous medium containing a substance selected from the group: alkali metal carbonate, alkali metal bicarbonate, alkali metal hydroxide, alkaline earth metal carbonate, alkaline earth metal bicarbonate, alkaline earth metal hydroxide, ammonium carbonate, ammonium bicarbonate, ammonium hydroxide.

ARTHUR ERNEST WILDER SMITH.